(12) United States Patent
Ki et al.

(10) Patent No.: US 10,691,340 B2
(45) Date of Patent: Jun. 23, 2020

(54) DEDUPLICATION OF OBJECTS BY FUNDAMENTAL DATA IDENTIFICATION

(71) Applicant: Samsung Electronics Co., Ltd., Suwon-si, Gyeonggi-do (KR)

(72) Inventors: Yang Seok Ki, Palo Alto, CA (US); Jason Martineau, Milpitas, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 15/789,795

(22) Filed: Oct. 20, 2017

(65) Prior Publication Data
US 2018/0364917 A1 Dec. 20, 2018

Related U.S. Application Data

(60) Provisional application No. 62/540,520, filed on Aug. 2, 2017, provisional application No. 62/522,423, filed on Jun. 20, 2017.

(51) Int. Cl.
*G06F 3/06* (2006.01)
*G06F 12/1018* (2016.01)
*G06F 12/02* (2006.01)

(52) U.S. Cl.
CPC ............ *G06F 3/0608* (2013.01); *G06F 3/065* (2013.01); *G06F 3/068* (2013.01); *G06F 3/0641* (2013.01);
(Continued)

(58) Field of Classification Search
CPC ...... G06F 3/0608; G06F 3/0641; G06F 3/065; G06F 3/0661; G06F 3/0679; G06F 12/1018; G06F 2212/401; G06F 2212/402
(Continued)

(56) References Cited

U.S. PATENT DOCUMENTS 7,363,326 B2 * 4/2008 Margolus ............ G06F 16/2358
707/663
8,117,464 B1 * 2/2012 Kogelnik ............ H04L 63/0428
713/193
(Continued)

FOREIGN PATENT DOCUMENTS

KR 10-1667757 B1 10/2016

OTHER PUBLICATIONS

C. Wang, Z. Qin, J. Peng and J. Wang, "A novel encryption scheme for data deduplication system," 2010 International Conference on Communications, Circuits, and Systems (ICCCAS), Chengdu, 2010, pp. 265-269. doi: 10.1109/ICCCAS.2010.5581996 (Year: 2010).*
(Continued)

*Primary Examiner* — Reginald G Bragdon
*Assistant Examiner* — Aaron D Ho
(74) *Attorney, Agent, or Firm* — Lewis Roca Rothgerber Christie LLP

(57) ABSTRACT

A method for writing data to a storage device including a processor, a volatile memory, and a non-volatile memory, the storage device being in communication with a host, the method includes receiving, by the processor, a command to write host data to the non-volatile memory, the host data being associated with a host identification, calculating, by the processor, a hash value associated with the host data, adding, by the processor, an object entry in an object map associated with the hash value, the object entry including the host identification and the hash value, and identifying, by the processor, whether there is a dedup entry in a deduplication map associated with the hash value, and writing, by the processor, stored data to the non-volatile memory based on the identification, the stored data being associated with and different from the host data.

22 Claims, 10 Drawing Sheets

(52) U.S. Cl.
CPC .......... *G06F 3/0661* (2013.01); *G06F 3/0679* (2013.01); *G06F 12/0246* (2013.01); *G06F 12/1018* (2013.01); *G06F 2212/401* (2013.01); *G06F 2212/7201* (2013.01)

(58) Field of Classification Search
USPC ........................................................ 711/102
See application file for complete search history.

(56) References Cited

U.S. PATENT DOCUMENTS

| | | | | |
|---|---|---|---|---|
| 8,199,911 | B1* | 6/2012 | Tsaur | G06F 16/1748 380/44 |
| 8,731,190 | B2* | 5/2014 | Lumb | G06F 3/0608 380/37 |
| 8,762,348 | B2* | 6/2014 | Lumb | G06F 3/0608 707/687 |
| 9,395,929 | B2* | 7/2016 | Bojinov | G06F 3/0622 |
| 9,495,552 | B2* | 11/2016 | El-Shimi | G06F 21/6218 |
| 9,547,774 | B2* | 1/2017 | Bestler | G06F 21/6227 |
| 9,773,836 | B1* | 9/2017 | Crocco | H01L 27/14698 |
| 2012/0216052 | A1* | 8/2012 | Dunn | G06F 21/78 713/193 |
| 2014/0025909 | A1 | 1/2014 | Naor et al. | |
| 2014/0358872 | A1 | 12/2014 | Shin et al. | |
| 2015/0100554 | A1 | 4/2015 | Wang et al. | |
| 2015/0154221 | A1 | 6/2015 | Shin et al. | |
| 2015/0302111 | A1 | 10/2015 | Yue et al. | |
| 2016/0099810 | A1 | 4/2016 | Li et al. | |
| 2017/0123676 | A1 | 5/2017 | Singhai et al. | |
| 2017/0149451 | A1 | 5/2017 | Shany et al. | |
| 2017/0255643 | A1* | 9/2017 | Maheshwari | G06F 16/1748 |

OTHER PUBLICATIONS

D. Harnik, B. Pinkas and A. Shulman-Peleg, "Side Channels in Cloud Services: Deduplication in Cloud Storage," in IEEE Security & Privacy, vol. 8, No. 6, pp. 40-47, Nov.-Dec. 2010.doi: 10.1109/MSP.2010.187 (Year: 2010).*
C. Fan, S. Huang and W. Hsu, "Encrypted Data Deduplication in Cloud Storage," 2015 10th Asia Joint Conference on Information Security, Kaohsiung, 2015, pp. 18-25.doi: 10.1109/AsiaJCIS.2015. 12 (Year: 2015).*
Wu, Chin-Hsien et al.; An Efficient B-Tree Layer for Flash-Memory Storage Systems, Department of Computer Science and Information Engineering, National Taiwan University, Taipei, Taiwan, 2003, 20 pages.

* cited by examiner

DEDUPLICATION OF OBJECTS BY FUNDAMENTAL DATA IDENTIFICATION

CROSS-REFERENCE TO RELATED APPLICATION(S)

This application claims priority to, and the benefit of, U.S. Provisional Application No. 62/540,520 ("DEDUPLICATION OF OBJECTS BY FUNDAMENTAL DATA IDENTITY"), filed on Aug. 2, 2017, and U.S. Provisional Application No. 62/522,423, filed on Jun. 20, 2017, the entire contents of which are incorporated herein by reference.

This application is related to U.S. application Ser. No. 15/688,779 ("SSD COMPRESSION AWARE"), filed on Aug. 28, 2017, the entire content of which is incorporated herein by reference.

FIELD

Aspects of embodiments of the present disclosure are generally related to a storage device. In particular, the present disclosure is related to a method and system for data deduplication.

BACKGROUND

Conventional deduplication is a well-proven method of increasing the functional storage capacity of a system. Conventional deduplication is based on pattern matching. When data matching a pattern is found, it is replaced with a reference to a single version of that data. Data matching may be performed in a number of ways that include matching a whole file/object (i.e., finding identical files), matching bit patterns in fixed block size components of the file/object, and matching bit patterns using fixed block sizes and a sliding window across a file/object.

In all these approaches, deduplication is done by matching bits across two sources (or a source and a library), while being indifferent to the nature of the source. As such, traditional deduplication systems are incapable of recognizing files/objects that are closely related from an end-user information content point of view. For example, traditional deduplication systems are not able to recognize that a plain text object, the compressed version of that object, and the encrypted version of that object all represent the same fundamental data, since all those versions have different bit patterns. Hence, these three copies would not be deduplicated.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure are directed to a content-aware deduplication system capable of improving file storage utilization by deduplicating plain data and reversibly-transformed versions of the same plain data, which may include compressed and/or storage system encrypted versions.

According to some embodiments of the present disclosure, there is provided a method for writing data to a storage device including a processor, a volatile memory, and a non-volatile memory, the storage device being in communication with a host, the method including: receiving, by the processor, a command to write host data to the non-volatile memory, the host data being associated with a host identification; calculating, by the processor, a hash value associated with the host data; adding, by the processor, an object entry in an object map associated with the hash value, the object entry comprising the host identification, the hash value, and a first record indicating how to convert the host data into standard data; and identifying, by the processor, whether there is a dedup entry in a deduplication map associated with the hash value, the dedup entry comprising the hash value and a second record indicating how to convert the standard data into storable data; and processing, by the processor, the host data for storage in the non-volatile memory as stored data based on the identification, the stored data being associated with and different from the host data.

In some embodiments, the object map is one of a plurality of object maps, each one of the plurality of object maps being associated with data of a different user of the storage device, and the dedup map is associated with data of all users of the storage device.

In some embodiments, the calculating the hash value comprises: determining, by the processor, that the host data is compressed; in response to the determining, decompressing, by the processor, the host data into decompressed host data according to a compression type of the host data; and calculating, by the processor, the hash value of the decompressed host data, wherein the object map further comprises the compression type.

In some embodiments, the processing the host data comprises: in response to identifying the dedup entry in the deduplication map associated with the hash value, updating the object map and incrementing a count number in the dedup entry without storing any further information in the non-volatile memory.

In some embodiments, the processing the host data comprises: in response to identifying the dedup entry in the deduplication map associated with the hash value and identifying a previously-stored data associated with the hash value that is compressed, replacing the previously-stored data with a more efficiently compressed stored data.

In some embodiments, the processing the host data comprises: in response to identifying the dedup entry in the deduplication map associated with the hash value and identifying a previously-stored data associated with the hash value that is encrypted, replacing the previously-stored data with a more efficiently encrypted stored data.

In some embodiments, the processing the host data comprises: in response to identifying the dedup entry in the deduplication map associated with the hash value: identifying, by the processor, the stored data associated with the hash value based on a first physical address in the dedup entry; identifying, by the processor, whether the stored data is encrypted based on the dedup entry; identifying, by the processor, whether the stored data is compressed based on the dedup entry; reformatting, by the processor, the stored data based on an encryption type and a compression type of the stored data; and identifying, by the processor, the standard data as the reformatted stored data; in response to identifying no dedup entry in the deduplication map associated with the hash value: identifying, by the processor, the standard data as the host data; processing, by the processor, the standard data into storable data for storage in a second physical address in the non-volatile memory; and updating, by the processor, the deduplication map.

In some embodiments, the reformatting the stored data comprises: in response to identifying the stored data as being encrypted: identifying, by the processor, the encryption type of the stored data in the dedup entry; identifying, by the processor, an encryption key of the stored data in the dedup entry as an off-drive key or a storage key; in response to identifying the encryption key as the off-drive key: not decrypting the stored data; in response to identifying the encryption key as the storage key: decrypting, by the processor, the stored data with the storage key and according to the encryption type; and in response to identifying the stored data as not being compressed: identifying, by the processor, the standard data as the decrypted stored data.

In some embodiments, the reformatting the stored data further comprises: in response to identifying the stored data as being compressed: identifying, by the processor, the compression type of the stored data in the dedup entry; and decompressing, by the processor, according to the compression type, the decrypted stored data or, in response to identifying the stored data as not being encrypted, the stored data to generate the standard data.

In some embodiments, the processing, by the processor, the standard data into storable data for storage comprises: determining, by the processor, whether the standard data is compressible based on one or more of quality of service (QoS) parameters, work load of the storage device, and user demands; determining, by the processor, whether the standard data is encryptable based on one or more of quality of service (QoS) parameters, work load of the storage device, and user demands; in response to determining that the standard data is compressible: compressing, by the processor, the standard data with an algorithm satisfying the QoS parameters to generate processed data; in response to determining that the standard data is not compressible: identifying, by the processor, the processed data as the standard data; and in response to determining that the standard data is not encryptable: storing, by the processor, the processed data at the second physical address in the non-volatile memory.

In some embodiments, the processing the standard data further comprises: in response to determining that the standard data is encryptable: encrypting, by the processor, the processed data with a key and by an algorithm satisfying the QoS parameters; and storing, by the processor, the encrypted processed data at the second physical address in the non-volatile memory.

In some embodiments, the key comprises an off-drive key or a storage key.

In some embodiments, the updating the deduplication map comprises: in response to identifying the dedup entry in the deduplication map associated with the hash value: updating, by the processor, the dedup entry in the deduplication map with the second physical address and one or more of an encryption key, encryption type, and compression type; and in response to identifying no dedup entry in the deduplication map associated with the hash value: adding, by the processor, a dedup entry in the deduplication map, the dedup entry comprising the second physical address and one or more of an encryption key, encryption type, and compression type for transforming the stored data into the standard data.

In some embodiments, the deduplication map and the object map are maintained in the volatile memory or the non-volatile memory of the storage device.

According to some embodiments of the present disclosure, there is provided a method for reading data from a storage device comprising a processor, a volatile memory, and a non-volatile memory, the storage device being in communication with a host, the method comprising: receiving, by the processor, a command to read host data from the non-volatile memory, the host data being associated with a host identification; identifying, by the processor, an object entry in an object map associated with the host identification, the object entry comprising the host identification, a hash value, and a first record indicating how to convert the host data into standard data; identifying, by the processor, the hash value of the object entry; identifying, by the processor, a dedup entry in a deduplication map associated with the hash value, the dedup entry comprising the hash value and a second record indicating how to convert the standard data into stored data associated with the host data; retrieving, by the processor, the stored data from the non-volatile memory based on a physical address in the dedup entry; identifying, by the processor, whether the stored data is encrypted based on the dedup entry; identifying, by the processor, whether the stored data is compressed based on the dedup entry; identifying, by the processor, whether the host data is compressed based on the object entry; and generating, by the processor, the host data from the stored data based on whether the stored data is encrypted, the stored data is compressed, and the host data is compressed.

In some embodiments, the generating the host data comprises: in response to identifying the stored data as being encrypted: identifying, by the processor, an encryption type and an encryption key in the dedup entry; decrypting, by the processor, the stored data associated with the hash value with a storage key and according to the encryption type; and in response to identifying the stored data and the host data as not compressed: identifying, by the processor, the host data as the decrypted stored data.

In some embodiments, the generating the host data further comprises: in response to identifying the stored data as being compressed: identifying, by the processor, a first compression type in the dedup entry; identifying, by the processor, a second compression type in the object entry; determining, by the processor, whether the first and second compression types are the same; in response to determining that the first and second compression types are the same: identifying, by the processor, the host data as the decrypted stored data or, in response to identifying the stored data as not being encrypted, as the stored data; and in response to determining that the first and second compression types are not the same: decompressing, by the processor, according to the first compression type, the decrypted stored data or, in response to identifying the stored data as not being encrypted, the stored data to generate the standard data; and compressing, by the processor, the standard data according to the second compression type to generate the host data.

In some embodiments, the second compression type is a non-compression, the compressing the standard data comprises not compressing the decompressed data, and the generating the host data comprises identifying the host data as the standard data.

According to some embodiments of the present disclosure, there is provided a method for deleting data from a storage device comprising a processor, a volatile memory, and a non-volatile memory, the storage device being in communication with a host, the method comprising: receiving, by the processor, a command to delete host data from the non-volatile memory, the host data being associated with a host identification; identifying, by the processor, an object entry in an object map associated with the host identification, the object entry comprising the host identification, a hash value, and a first record indicating how to convert the host data into standard data; identifying, by the processor, the hash value of the object entry; identifying, by the processor, a dedup entry in a deduplication map associated with the hash value, the dedup entry comprising the hash value and a second record indicating how to convert the standard data into stored data associated with the host data; decrementing, by the processor, a count in the dedup entry; determining, by the processor, whether the count equals zero; and deleting, by the processor, one or more of the object entry and the dedup entry based on the count.

In some embodiments, in response to determining that the count equals zero: deleting, by the processor, the dedup entry from the deduplication map; and deleting, by the processor, the object entry from the object map; identifying, by the processor, the stored data associated with the host data in the non-volatile memory based on a physical address in the dedup entry; and deleting, by the processor, the stored data, and wherein in response to determining that the count does not equal zero: deleting, by the processor, the object entry from the object map.

According to some embodiments of the present disclosure, there is provided a deduplication system for writing data to a storage device in communication with a host, the deduplication system comprising: a processor; and a processor memory local to the processor, wherein the processor memory has stored thereon instructions that, when executed by the processor, cause the processor to perform: receiving a command to write host data to a non-volatile memory, the host data being associated with a host identification; calculating a hash value associated with the host data; adding an object entry in an object map associated with the hash value, the object entry comprising the host identification, the hash value, and a first record indicating how to convert the host data into standard data; and identifying whether there is a dedup entry in a deduplication map associated with the hash value, the dedup entry comprising the hash value and a second record indicating how to convert the standard data into stored data; and processing the host data for storage in the non-volatile memory as stored data based on the identification, the stored data being associated with and different from the host data.

According to some embodiments of the present disclosure, there is provided a deduplication system for reading data from a storage device in communication with a host, the deduplication system comprising: a processor; and a processor memory local to the processor, wherein the processor memory has stored thereon instructions that, when executed by the processor, cause the processor to perform: receiving a command to read host data from a non-volatile memory, the host data being associated with a host identification; identifying an object entry in an object map associated with the host identification, the object entry comprising the host identification, a hash value, and a first record indicating how to convert the host data into standard data; identifying the hash value of the object entry; identifying a dedup entry in a deduplication map associated with the hash value, the dedup entry comprising the hash value and a second record indicating how to convert the standard data into stored data associated with the host data; retrieving the stored data from the non-volatile memory based on a physical address in the dedup entry; identifying whether the stored data is encrypted based on the dedup entry; identifying whether the stored data is compressed based on the dedup entry; identifying whether the host data is compressed based on the object entry; and generating the host data from the stored data based on whether the stored data is encrypted, the stored data is compressed, and the host data is compressed, the host data being different from the host data.

According to some embodiments of the present disclosure, there is provided a deduplication system for deleting data from a storage device in communication with a host, the deduplication system comprising: a processor; and a processor memory local to the processor, wherein the processor memory has stored thereon instructions that, when executed by the processor, cause the processor to perform: receiving a command to delete host data from a non-volatile memory, the host data being associated with a host identification; identifying an object entry in an object map associated with the host identification, the object entry comprising the host identification, a hash value, and a first record indicating how to convert the host data into standard data; identifying the hash value of the object entry; identifying a dedup entry in a deduplication map associated with the hash value, the dedup entry comprising the hash value and a second record indicating how to convert the standard data into stored data associated with the host data; decrementing a count in the dedup entry; determining whether the count equals zero; and deleting one or more of the object entry and the dedup entry based on the count.

BRIEF DESCRIPTION OF THE DRAWINGS

The accompanying drawings, together with the specification, illustrate example embodiments of the present disclosure, and, together with the description, serve to explain the principles of the present disclosure.

DETAILED DESCRIPTION

The detailed description set forth below is intended as a description of example embodiments of a system and method for defect detection, provided in accordance with the present disclosure, and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Embodiments of the present disclosure are directed to a deduplication system that is capable of identifying alternate forms of the same data, and treating them all as duplicates of each other. In some embodiments, the deduplication system recognizes plain data, compressed data, and storage system encrypted data copies as containing the same information, and deduplicates them with respect to each other. In some embodiments, a data converter of the deduplication system converts input data into standard data, and then into stored data (and back again). The converter tracks (as a plan) the steps needed to perform said operations in two levels of tracking tables, namely a user table, and a global deduplication table. The user table (hereinafter referred to as the object map) tracks keys/IDs, hash values, and how the original data of the key/ID can be generated from standard data. The global dedup table (hereinafter referred to as the deduplication map) tracks all unique data by hash value, indicates the final storage form, the storage address, and how the final storage form can be converted back into standard data.

Figure 1:
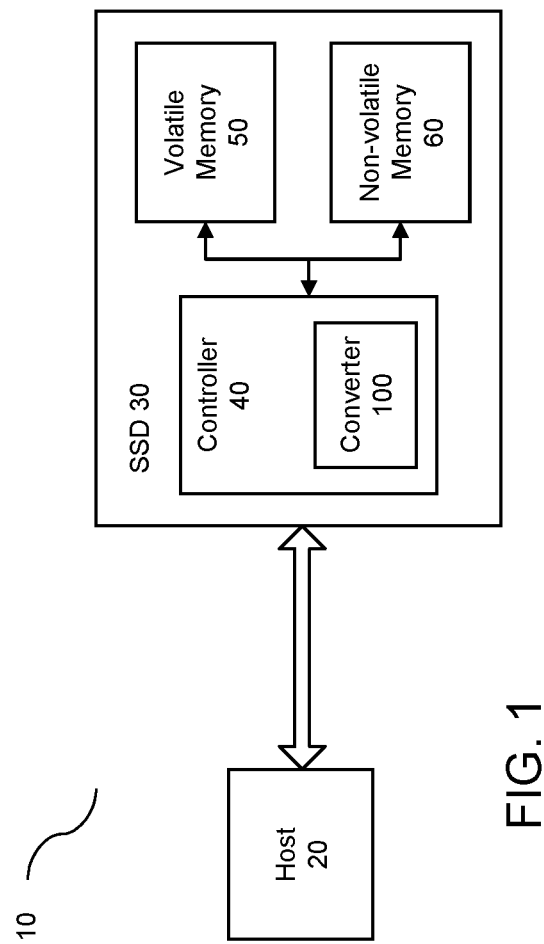
FIG. 1 is a block diagram illustrating a system including a host in communication with a storage device for performing data queries, according to some exemplary embodiments of the present invention.

FIG. 1 is a block diagram illustrating a system 10, which includes a host 20 (e.g., a server host) in communication with a storage device 30 for performing data queries, according to some exemplary embodiments of the present invention.

In some embodiments, the host 20 and the storage device 30 may be implemented in a local-based or cloud-based computing environment. The host 20 and the storage device 30 can be in communication with each other via a wired or wireless connection. For example, in one embodiment, the storage device 30 may include pins (or a socket) to mate with a corresponding socket (or pins) on the host 20 to establish an electrical and physical connection. In another embodiment, the storage device 30 can include a wireless transceiver to place the host 20 and the storage device 30 in wireless communication with each other. The host 20 and the storage device 30 may be separately housed from each other, or contained in the same housing. The host 20 and the storage device 30 may include additional components, which are not shown in FIG. 1 to simplify the drawing. As used herein, the phrase "in communication with" refers to being in direct communication with, or in indirect communication with, via one or more components named or unnamed herein. The host 20 and the storage device 30 may communicate using any suitable data bus and protocol, such as the universal serial bus (USB), peripheral component interconnect express (PCIe), or the like.

The host 20 may include a processing device, such as a central processing unit (CPU), which performs operations on queried data. The data may be written to the storage device 30 or may be read from the storage device 30, processed by the CPU, and the processed data may be sent to the source of a request. The host 20 may operate based on logical addresses of the data, and may be unaware of the physical locations (e.g., also referred to as physical addresses) of the data stored on the storage device 30.

According to some embodiments of the present invention, the storage device 30 may include a controller 40, a volatile memory 50 (e.g., dynamic random access memory (DRAM)), and a non-volatile memory 60 (e.g., flash memory).

The controller 40 facilitates the transfer of data to and from the storage device 30 and includes a data converter (also referred to as a "converter") 100, which performs deduplication of host data queries.

According to some embodiments, the deduplication system (e.g., the converter 100) is capable of identifying alternate forms of the same data, and treating them all as duplicates of each other. Thus, any plain data and reversibly-transformed version of the plain data, such as compressed data and storage system-encrypted (or drive-encrypted) data, are all recognized as containing the same information, and may be deduplicated with respect to each other. In some embodiments, user-encrypted data is deduplicated using a traditional bit pattern-based approach, because the encryption key is generally known only to the user, and not the converter 100, and thus, the converter 100 does not have the means to decrypt the user-encrypted data. As used throughout this disclosure, a user refers to a logical user, which could be an individual user (i.e., a human user) or an application.

Figure 2:
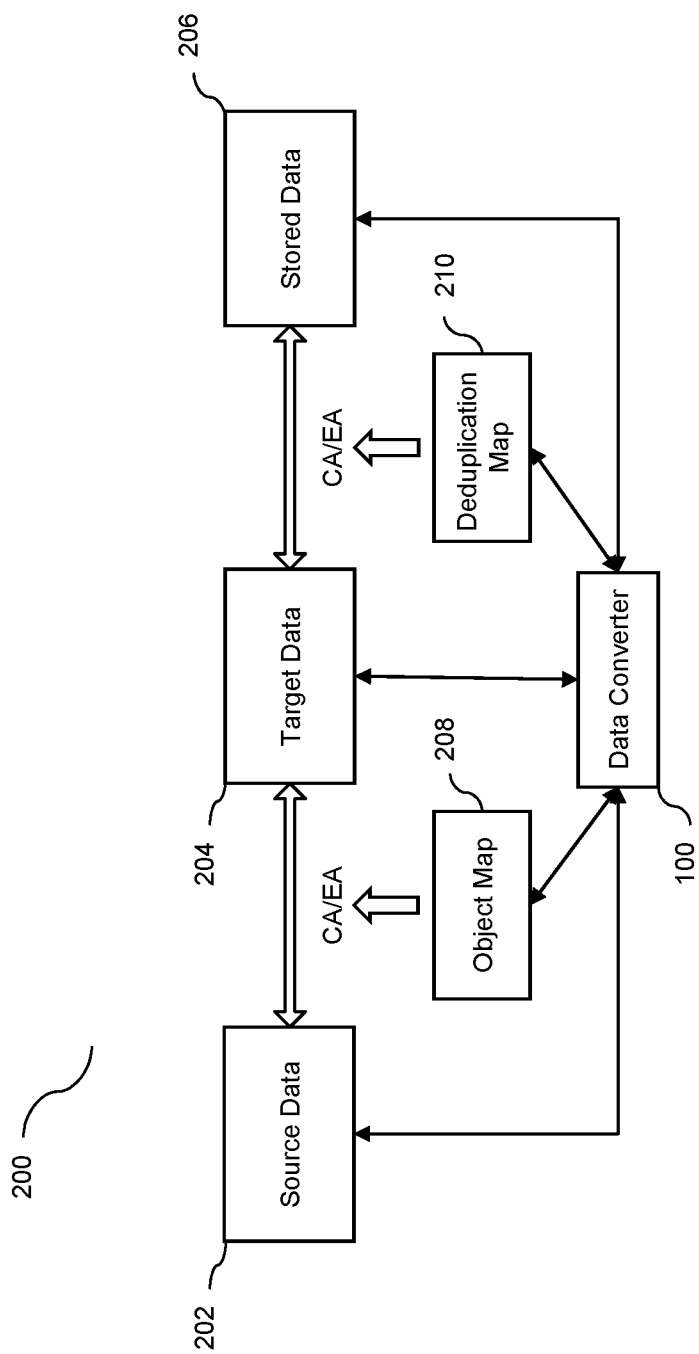
FIG. 2 is a diagram illustrating the process of data deduplication using a deduplication system, according to some exemplary embodiments of the present invention.

FIG. 2 is a diagram illustrating the process 200 of data deduplication using a deduplication system, according to some exemplary embodiments of the present invention.

According to some embodiments, the deduplication includes the converter 100, an object map 208 and a deduplication map 210. The converter 100 deduplicates across related data entries by converting them all back to standard data (also referred to as target data) and comparing different data in standard form. In some embodiments, standard data is one that is not transformed (e.g., compressed and/or encrypted) and is in plain/raw/fundamental form (e.g., an uncompressed and unencrypted text file); however, embodiments of the present invention are not limited thereto, and the standard may be compressed and/or encrypted data, as may be suitable in a given application. In embodiments in which the standard data is plain data, the converter 100 converts source data to standard data by decompressing source data that is compressed, decrypting source data that is encrypted at a storage/drive level, and maintaining plain data as is. In some embodiments, user-encrypted data is not decrypted by the converter 100 and is treated as a form of standard data.

In some examples, the converter 100 may store the deduplicated standard data in the non-volatile memory 60, or may further compress and/or encrypt the standard data before storing it, in order to make more effective use of storage space and/or improve the security of stored data.

According to some embodiments, a record (e.g., a first record) of any operation(s) (e.g., decompression/compression operation (CA) and/or decryption/encryption (EA) operation) performed on source data 202, which may be host data (e.g., from the host 20), to convert it to standard data 204 is maintained at the object map 208. A record (e.g., a second record) of any encoding operation(s) (e.g., compression/decompression operation (CA) and/or encryption/decryption (EA) operation) to convert the standard data to stored data 206 is maintained at the deduplication map 210 (e.g., a dedup map). The records maintained at the object and deduplication maps 208 and 210 allow the converter to later convert stored data 206 into an appropriate data format upon, for example, a read query from the host 20. In some examples, the object and deduplication maps 208 and 210 may be stored at the volatile memory 50 of the storage device 30; however, embodiments of the present invention are not limited thereto, and one or more of the object and deduplication maps 208 and 210 may be stored at the non-volatile memory 60 of the storage device 30.

Figure 3:
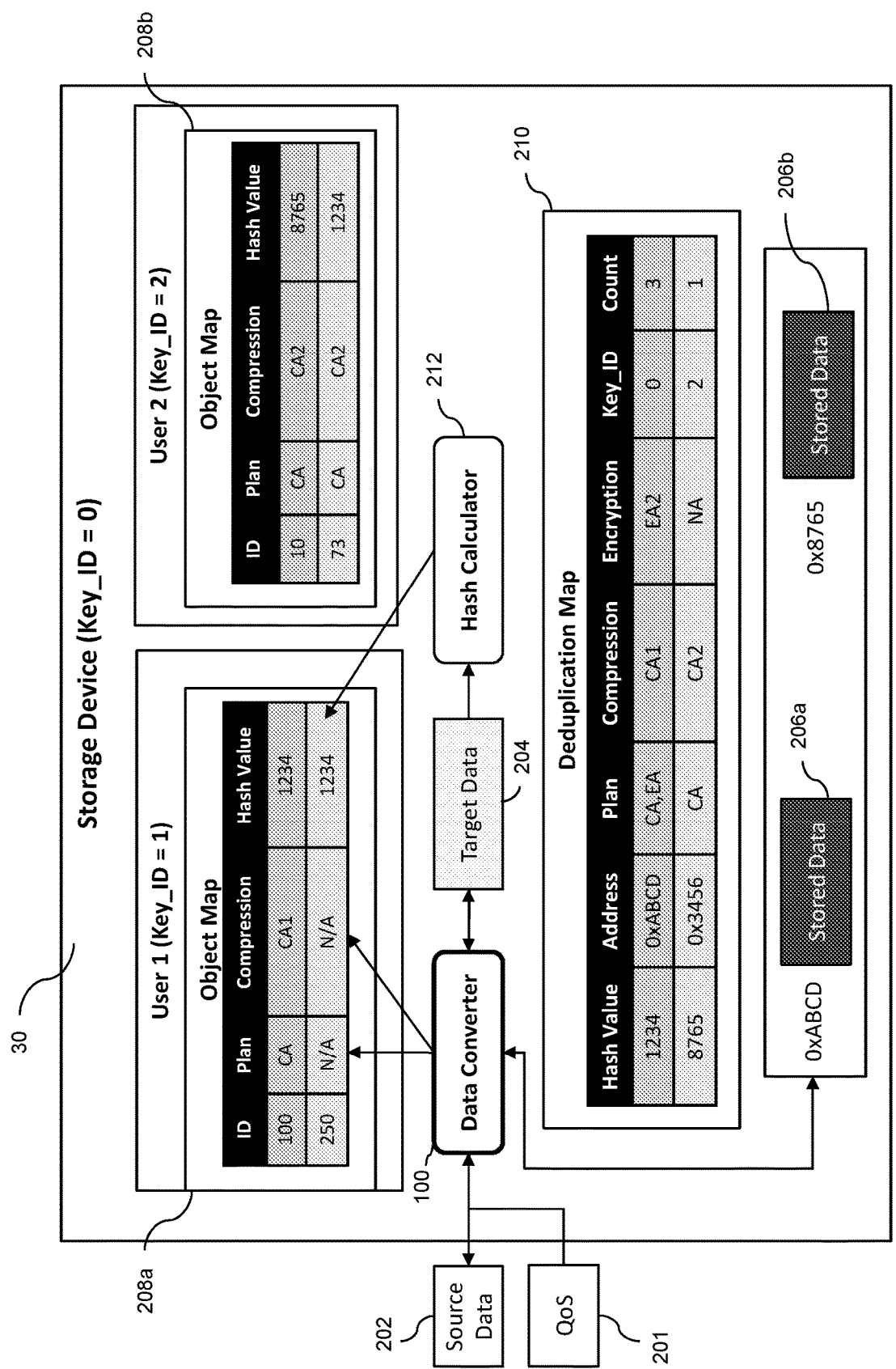
FIG. 3 is a diagram illustrating the operation of a converter of a deduplication system in relation to an object and a deduplication map of the system, according to some exemplary embodiments of the present invention.

FIG. 3 is a diagram illustrating the operation of the converter 100 in relation to the object and deduplication maps 208 and 210, according to some exemplary embodiments of the present invention.

According to some embodiments, each user (or other logical division of data ownership) may have an object table associated with it. For example, in FIG. 3, object maps 208a and 208b are respectively associated with user 1 and user 2. Each object table includes a plurality of object entries, where each object entry includes a host identification (ID), a plan indicating how the source data 202 associated with the host ID was turned into standard data 204, and a hash value that is based on the standard data 204 and is associated with the host ID of the data.

In some embodiments, when source data 202 is received from the host 20, the converter 100 converts all incoming data into a standard form called standard data 204. The hash calculator 212 calculates a hash value for the standard data 204, and the user's object map 208a/208b is updated to include the host ID of the source data 202, the plan and compression information found by the converter 100, and the hash value for the standard data 204.

For example, in FIG. 3, the object map 208a of user 1 indicates that source data with host ID "100", which was compressed, was decompressed (as indicated by "CA" in the plan field) using compression type "CA1" to be converted to standard form, and the hash value of the corresponding standard data is "1234". Similarly, source data with host ID "250", which was already in standard form, was not decompressed (as indicated by "N/A" in the plan field, and the compression type "N/A"), and has the same hash value as data with host ID "100", indicating that it is the same as the standard form of source data with host ID "100" (In other words, user 1 has saved both a compressed and a decompressed version of the same file to the device). Further, as indicated by the object map 208b of user 2, the source data with host ID "73", which was compressed, was decompressed (as indicated by "CA" in the plan field) using compression type "CA2" to be converted to standard form, and the hash value of the corresponding standard data is also "1234" (i.e., user 2 has also saved a version of the file above, but using a different compression algorithm). As the two data associated with user 1, as well as the data with host ID "73" associated with user 2 have the same hash value, they are treated by the converter 100 as being fundamentally the same, and the three pieces of data are then deduplicated by the converter 100. As such, and as will be illustrated below, only stored data 206 is maintained (e.g., at address "0xABCD") in the non-volatile memory 60, as opposed to storing 3 different files (i.e., a plain or standard form file, and two compressed files with different compression types (i.e., "CA1" and "CA2")). This reduces the demand on storage capacity.

According to some embodiments, standard data 204 is further processed by the converter 100 to yield stored data 206, which is deduplicated using the deduplication map 210. The deduplication map 210 includes a table with a plurality of deduplication entries (also referred to as "dedup entries"), whereby each dedup entry indicates a standard data hash value, a physical address of where the associated stored data is saved in the non-volatile memory 60, the plan used to generate the stored data from the standard data, the identities or types of any compression or encryption algorithms used to create the final stored copy, encryption key IDs for the data, and a reference count. When the converter 100 prepares standard data for storing in the non-volatile memory 60, the standard data's hash value is compared with the deduplication map 210. If the hash value is new and unique, it is stored as a new dedup entry, along with all of the associated information indicated above. If the hash value is not unique, then the existing dedup entry with the hash value is updated with an incremented count number.

For example, in FIG. 3, the first dedup entry in the deduplication map 210 (which is the first row in the table) indicates that the three pieces of source data with host IDs "73", "100", and "250", which have the same standard form hash value "1234", were written to the non-volatile memory 60 at physical address "0xABCD" as a stored data 206a. The dedup entry further indicates that the associated standard data was compressed (with compression type/algorithm "CA1") and then encrypted (with encryption type/algorithm "EA2" and storage key, which has key ID "0") in order to generate the stored data 206a. The count reference "3" indicates that three different source data are associated with the same stored data 206a. In addition to indicating the encryption key used, the key ID may also identify the rights associated with the data. For example, key ID "0" indicates that the corresponding stored data is available throughout the device, and a key ID "2" indicates that the particular dedupe entry (e.g., associated with hash value "8765" in FIG. 3) is dedicated to user 2.

Here, standard data is hashed to provide a link between each user's instance of the data (as represented by the host IDs) and the global deduplication map 210. The hash value is also referenced in the deduplication map 210 to determine if duplicates occur. As will be understood by a person of ordinary skill in the art, any of the numerous well known mechanisms for avoiding/handling hash collisions may be used herein to ensure data uniqueness.

According to some embodiments, when duplicates are found, the data type with the highest priority is stored in the non-volatile memory 60, and then all other instances are referred to it. In some embodiments, encrypted data is given higher priority than compressed data, which has higher priority than plain data. Such priority determinations promote data security and storage utilization efficiency. However, embodiments of the present invention are not limited thereto, and levels of priority of data types may be defined in any suitable manner. For example, encrypted data may be given a higher priority than plain/standard data, which may have higher priority than compressed data. This may be done in order to balance security with speed of access.

The deduplication map 210 includes information on which version of the data is maintained, and how to restore the original form of deduplicated information. Therefore, for example, when a user requests a plain text version of a file, but the compressed (or encrypted) version is the one stored in the non-volatile memory 60, the converter 100 knows to decompress or unencrypt the stored data to return the plain version.

According to some embodiments, the deduplication system, which includes the converter 100, the object map 208, the deduplication map 210, and the hash calculator 212, allows for the final form of the stored data to change, even after being written to the non-volatile memory 60. To wit, for example, if the first form of the stored data is created using a less efficient compression algorithm, later attempts to store the same fundamental data can result in replacing the one stored copy with a more efficiently compressed version. This topic will be discussed in more detail later.

As there are only a limited number of possible compression and encryption algorithms (and associated "plans") used to generate standard data from source data, or stored data from standard data, these entries on the table need not be of indeterminately large size.

Figure 4:
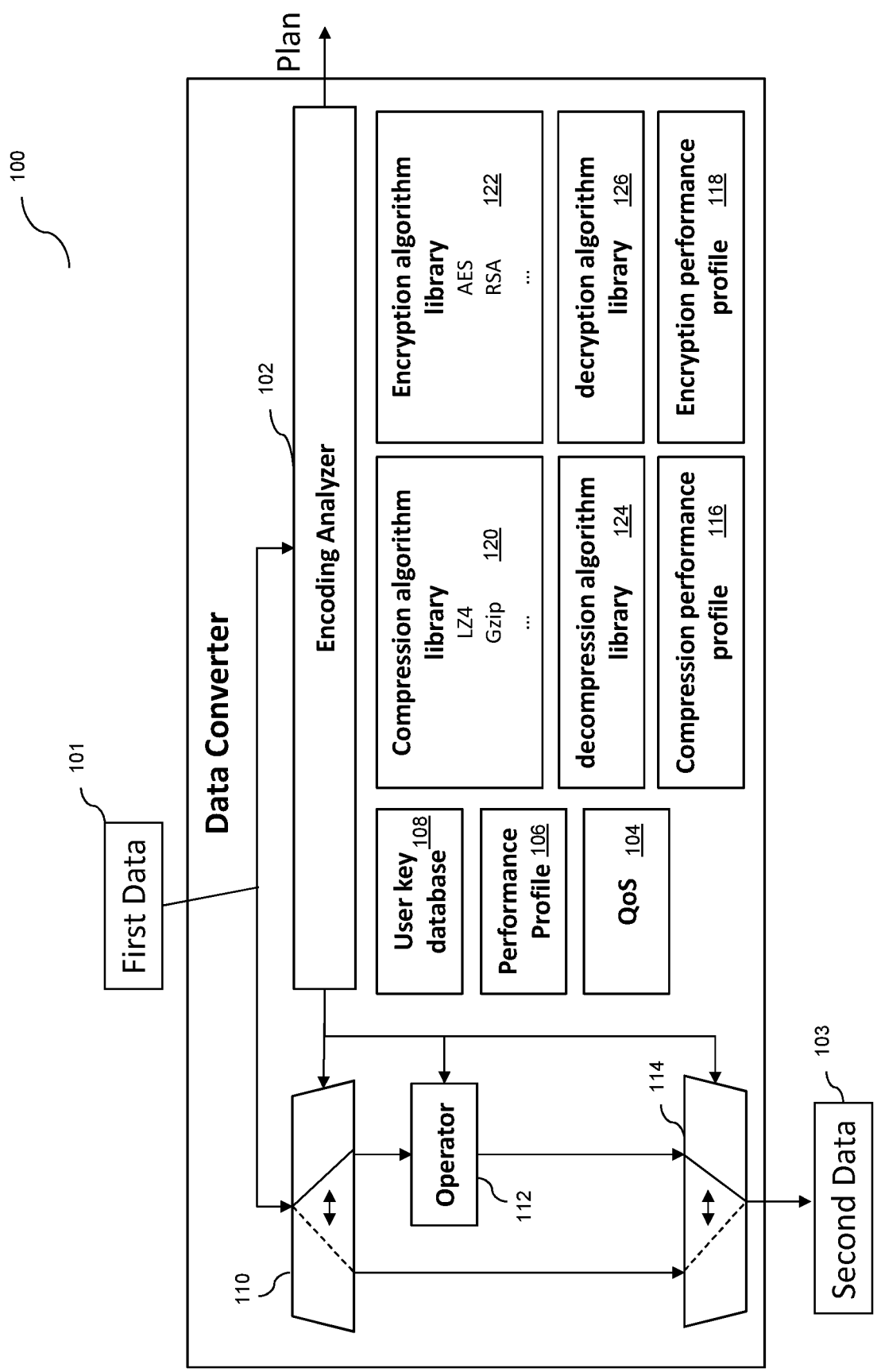
FIG. 4 is a block diagram illustrating the converter, according to some exemplary embodiments of the present invention.

FIG. 4 is a block diagram illustrating the converter 100, according to some exemplary embodiments of the present invention.

In some embodiments, the converter 100 of the deduplication system converts input source data into standard data, and then into stored data (and back again). The converter 100 tracks (as a plan) the steps needed to perform said operations in two levels of tracking tables, namely an object table 208, and a global deduplication table 210. The user table tracks keys/IDs, hash values, and how the data of the key/ID can be generated from the standard data. The global deduplication table 210 tracks all unique data by hash value, indicates the final storage form, the storage address, and how the final storage form can be converted back into standard data.

According to some embodiments, the converter 100 is also aware of QoS and performance limitations of the drive. Therefore, it can be selective of the compression/encryption algorithms used to finally store data. Further, since the environment can change, stored data can be later re-encrypted or compressed with different algorithms if the QoS/performance allows.

According to some embodiments, the data converter 100 includes an encoding analyzer 102 for analyzing a first data 101 (e.g., the source data 202) to determine if and how to transform the first data 101 into a second data 103 (e.g., the standard data 204).

Upon receiving the first data 101, the encoding analyzer 102 first identifies the compression and/or encryption of the first data 101. In some embodiments, the encoding analyzer 102 identifies the file type of the first data 101 based on the extension of the first data 101 or the signature of the first data 101, which may be included in the header or at a specific known location within the data. Further, other metadata may be included in the header or at predictable offsets within the first data 101 that may be used in addition to or instead of the file signature to predict compressibility and/or encryptability. For example, the header may include other metadata that indicates what the file format of the value is. In some embodiments, when the relevant meta data is not present in the file header or discernible through the file extension, the encoding analyzer 102 may employ a mathematically more complex compressibility and/or encryptability algorithm (e.g., an entropy calculation based measurement) on a sample of the first input data. Generally, data that has already been compressed and/or encrypted has higher entropic characteristics. An uncompressed data is more likely to have ordered data that is easier to compress. Thus, high entropy may indicate that the value is likely not compressible and low entropy may indicate that the first data 101 is likely to be compressible.

According to some embodiments, in determining whether or not to compress and/or encrypt the first data 101, the encoding analyzer 102 considers various suitable factors including QoS parameters and performance capabilities of the storage device 30. QoS parameters and information may be incorporated into a QoS profile 104. The QoS profile 104 incorporates considerations such as the user's current performance requirements and needs, so that any compression and/or encryption algorithm that runs will not adversely affect the performance demands of the user. QoS information may be used by the encoding analyzer 102 to determine if a predicted compression ratio or encryption level satisfies QoS parameters.

Performance capabilities of the storage device 30 may be stored in a device performance profile 106. The device performance profile 106 tracks static and dynamic aspects of the storage device's performance. This information may be used by the encoding analyzer 102 to determine if a value can be compressed enough to meet the needs of the storage device 30 and the QoS profile 104.

Some or all of the above metadata information, entropy-based calculations, sample compressions, QoS requirements and device information can be analyzed by the encoding analyzer 102 to predict whether or not compressing the first data will result in a useful compression ratio or encryption level, or if it would negatively impact the QoS.

Once a determination is made by the encoding analyzer 102 as to whether or not to compress and/or encrypt the first data 101, the encoding analyzer 102 controls the demultiplexer 110, based on the determination, to switch between outputting the first data 101 to the operator 112 or circumventing the operator 112 and sending the first data 101 straight to a multiplexer 114 for output as the second data 103. In some embodiments, when the encoding analyzer 102 determines that compression and/or encryption should occur, the demultiplexer 110 sends the first data 101 to the operator 112, and when the encoding analyzer 102 determines that compression should not occur, the demultiplexer 110 passes the first data 101 through without transformation, that is, sends the first data 101 to the multiplexer 114 for output as the second data 103.

When the first data 101 is found to warrant compression and/or encryption and is sent to the operator 112, the operator 112 then determines how to compress and/or encrypt the first data 101. In determining how to compress and/or encrypt the first data 101, the operator 112 can consider information from various inputs including the QoS profile 104, the device performance profile 106, and the compression and/or encryption algorithm performance based on the compression performance profile 116 and/or encryption performance profile 118 to determine which compression and/or encryption algorithm to apply to the first data 101. QoS information from the QoS profile 104 may be used by the operator 112 to determine if a given compression and/or encryption algorithm's performance characteristics meet the needs of the end user. Information from the device performance profile 106 may be used by the operator 112 to determine which compression and/or algorithm(s) would most effectively make use of the device resources, given the first data 101 to be compressed and/or encrypted. Therefore, depending on the current QoS needs (as provided by the QoS profile 104) and the performance capabilities of the device 10 (as provided by the device performance profile 106), specific algorithms may be preferred over others.

Once a compression and/or encryption algorithm is selected, a compression algorithm library 120 and/or a compression algorithm library 122 provide(s) code to the operator 112 to initiate compression and/or encryption of the given first data 101. The compression and encryption algorithm libraries 120 and 122 include code for executing the compression and encryption algorithms. Once compression and/or encryption is complete, the multiplexer 114 outputs the compressed and/or encrypted data as the second data 103.

In some examples, when compression is being done to data in-line rather than at rest, or when the instant QoS demands allow for minimal processing, an actual compression ratio achieved at one write may not be an optimal compression ratio. This may be caused by, for example, the limited space for a write buffer allocated to incoming data (such that not all data can be analyzed and compressed at once), or due to the drive being occupied with other high-value tasks, necessitating low-intensity compression. For example, QoS parameters may demand a "quick and dirty" compression, where the data is compressed quickly, but not necessarily to its most optimal compression, to maintain the performance capabilities of the storage device 30 needed by the user. In such situations, it is possible that the drive can re-compress the data more efficiently later. For example, at a later time when the disk is idle or must otherwise read and write the subject information (i.e., garbage collection/wear leveling), a compressed value may be decompressed and analyzed again (using the methods above) to determine if a more optimal compression may be achieved. In this way, for example, a stream of data that was originally compressed in-line may be more fully compressed later in an "at rest" situation.

To facilitate such re-compression, a hidden key that encodes compression information may be added to the original key. This hidden key may be ignored for normal key processing operations such as index built, search, etc., but may be accessed when QoS demands are low. The hidden key may include information regarding the type of compression currently being used and commands to initiate recompression. The hidden key may be updated whenever a new compression scheme is applied to the value.

While the converter 100 has been described above as compressing/encrypting a first data 101 into a second data 103, embodiments of the present invention are not limited thereto. In some embodiments, the converter 100 is also capable of decompressing/decrypting the first data 101 into the second data 103, in manner similar to that described above, but using the decompression algorithm library 124 and the decryption algorithm library 126.

The converter 100 is similar to the data converter disclosed in the related U.S. application Ser. No. 15/688,779 ("SSD COMPRESSION AWARE"), filed on Aug. 28, 2017, the entire content of which is incorporated herein by reference. As such, certain aspects of the converter 100 may not be repeated here.

Figure 5A:
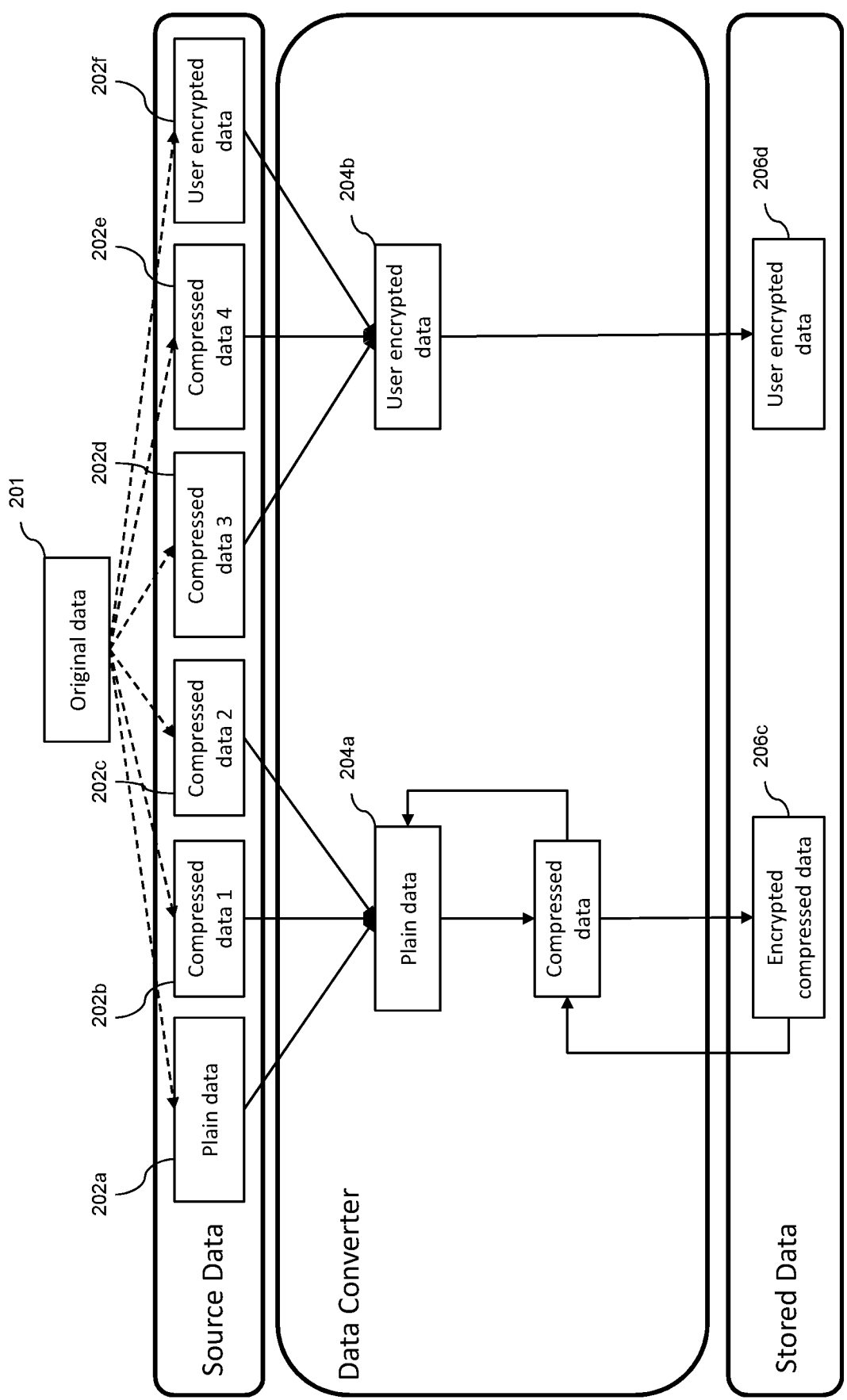
FIGS. 5A-5B are diagrams illustrating the deduplication operation performed by the converter, according to some exemplary embodiments of the present invention.
Figure 5B:
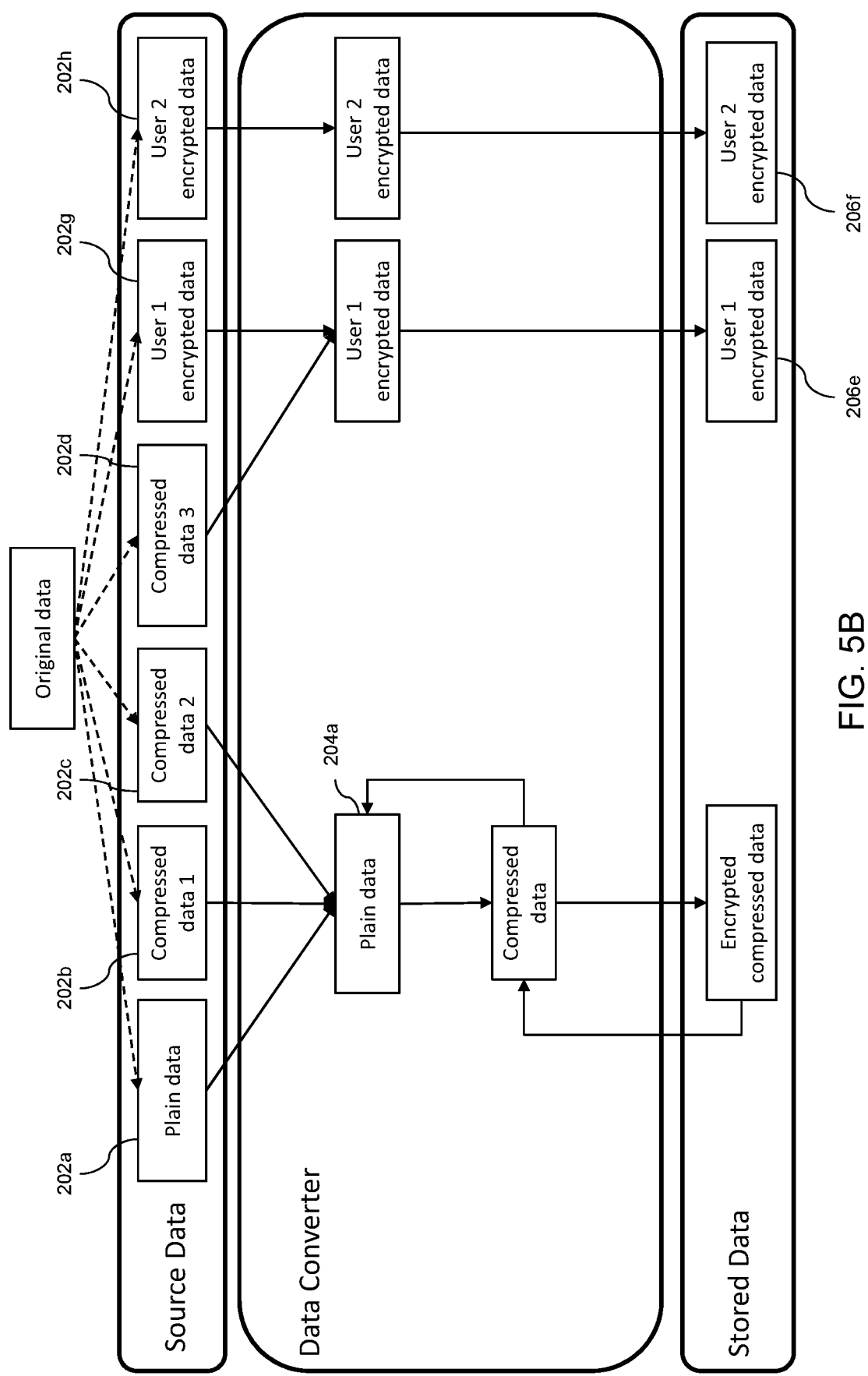

FIGS. 5A-5B are diagrams illustrating the deduplication operation performed by the converter 100, according to some exemplary embodiments of the present invention.

FIG. 5A illustrates examples in which the source data are all owned by a single user. Original data may take on one of four general forms: plain data (e.g., plain data 202a), compressed data (e.g., compressed data 202b and 202c), user-encrypted data (e.g., encrypted data 202f), and user-encrypted then compressed data (e.g., compressed data 202d and 202e). In some examples, data that is user-encrypted after compression may be treated as simply user-encrypted data, since the converter 100 may not be able to decrypt it to determine the compression method.

The converter 100 turns any compressed file for which it has a compression library into an uncompressed format. This results in either a plain data or an encrypted data, which are treated as standard data according to some embodiments. For example, the converter 100 maintains plain data 202a and the user-encrypted data 202f as is, decompresses compressed data 202b and 202c using appropriate decompression algorithms to convert them to plain data 204a, and decompresses compressed data 202d and 202e using appropriate algorithms to convert them to user-encrypted data 204b.

The converter 100 then transforms the standard data into stored data. For example, plain data 204a may be compressed and/or encrypted into stored data 206c, according to the device profile, user demands, work load of the storage device 30, and QoS (201) parameters (e.g., restraints). The encryption may be based on user keys, the identity of which may be recorded and/or referenced in the deduplication map's key ID field. In some examples, the user-encrypted standard data 204b may be further compressed in rare circumstances, but this is generally unlikely, as encrypted data usually exhibits high entropy and is a poor choice for compression under most QoS (201) restraints. As such, the user-encrypted data 204b may be stored without further transformation as stored data 206d.

FIG. 5B illustrates examples in which the source data are owned by a plurality of users (e.g., user 1 and user 2). The deduplication operation for multi-user source data is substantially similar to that described above with respect to the single-user source data of FIG. 5A, with a number of exceptions. First, when the converter 100 compresses and encrypts plain standard data 204a, it does so using storage keys (as identified in the key ID field of the deduplication map 210), such that all parties with access to original unencrypted data may maintain such access. Second, if multiple users have distinct encrypted versions of the same file (e.g., compressed user-encrypted data 202d and user-encrypted data 202g associated with user 1, and user-encrypted data 202h associated with user 2), these versions would be preserved as distinct entities after deduplication (e.g., as stored data 206e and stored data 206f), in order to allow each user access to distinct and separate forms of the data. Thus, when multiple users store shared data, storage device keys are used in any final re-encryption. Further, different users with their own self-encrypted versions of the same document will have their own separate and distinct finally-saved versions of the data. For non-shared data, final storage level encryption may be done with user keys, to increase security.

Figure 6A:
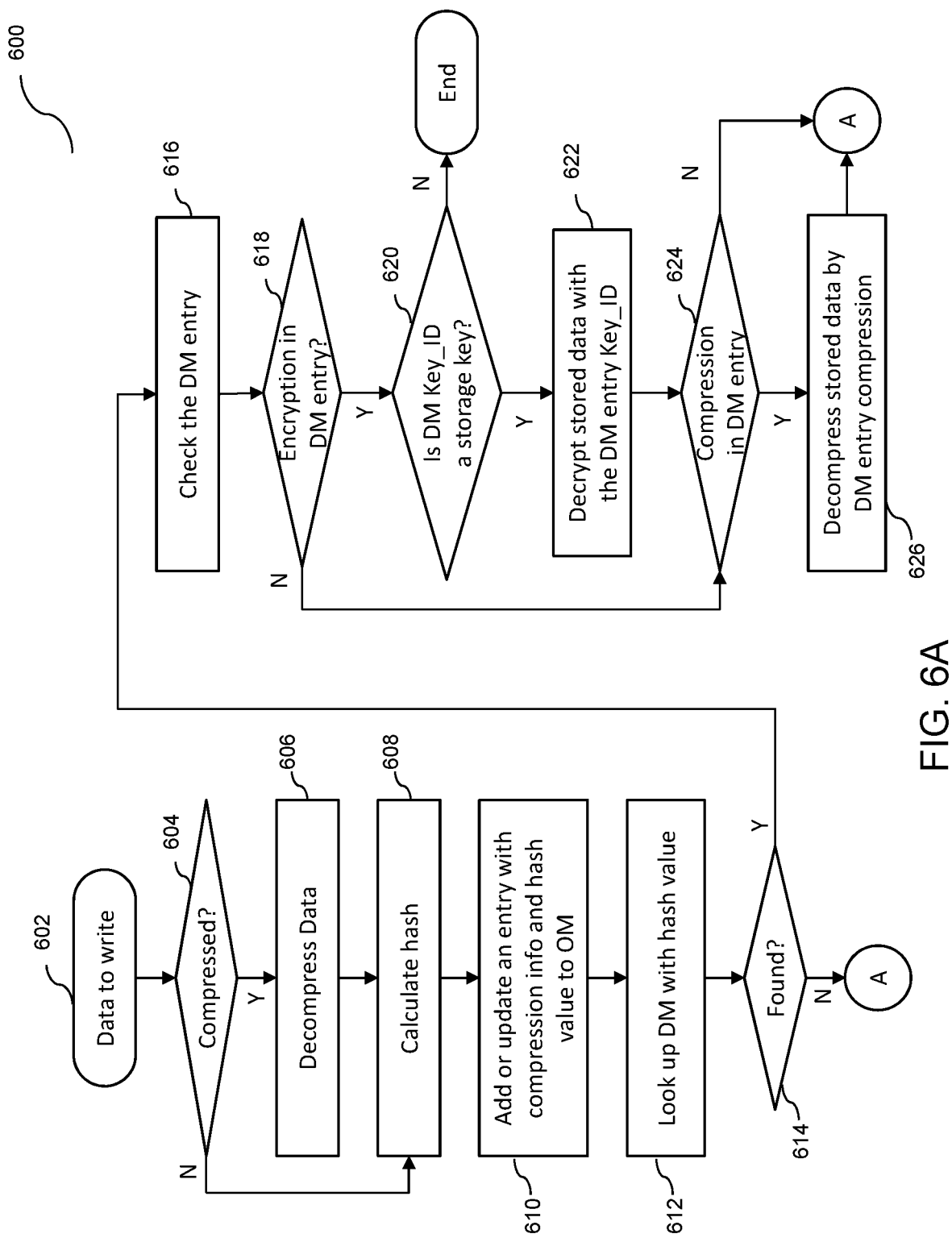
FIGS. 6A-6B are flow diagrams illustrating a process of writing source data to the non-volatile memory of the storage device using the deduplication system, according to some exemplary embodiments of the present invention.
Figure 6B:
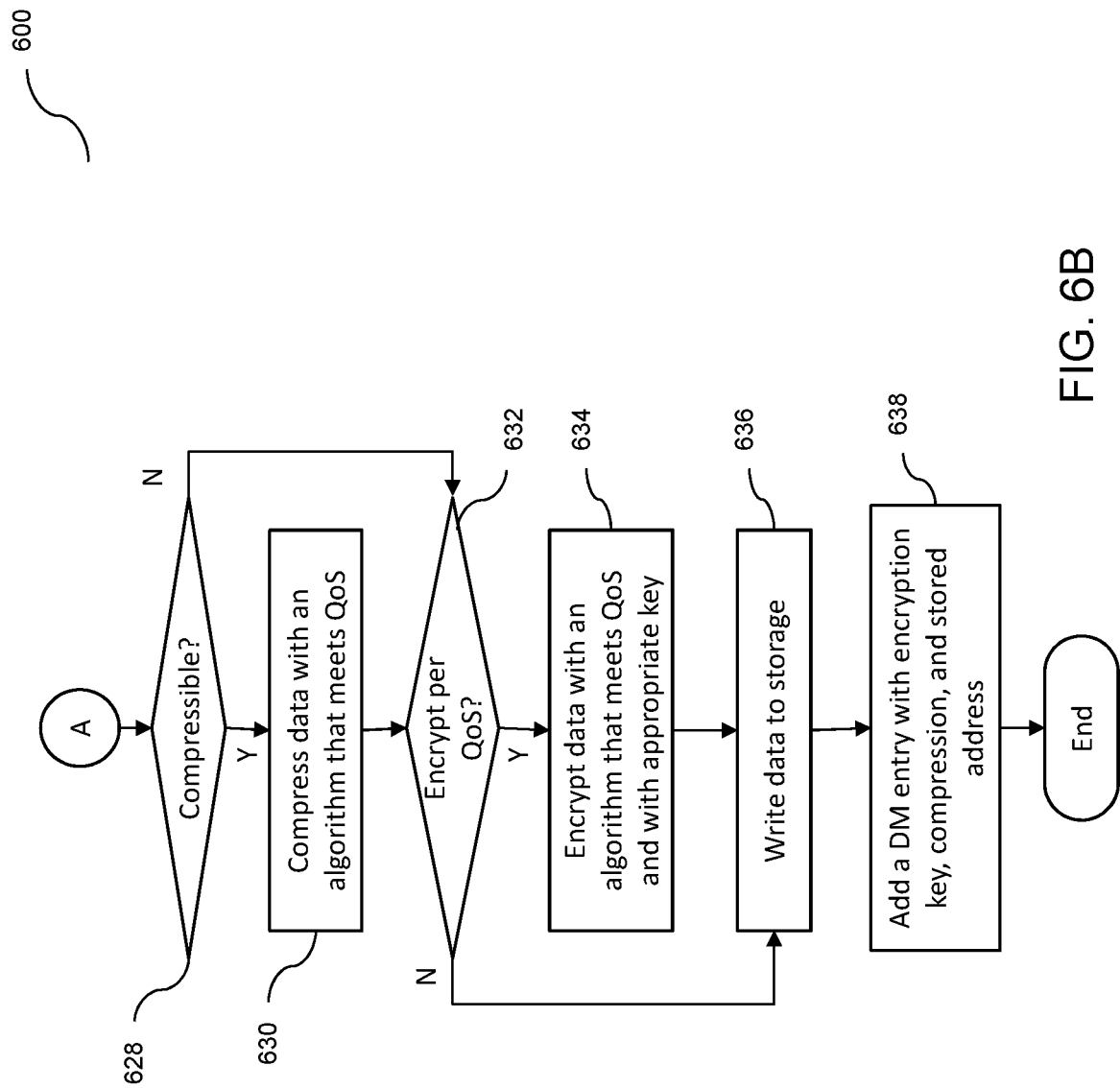

FIGS. 6A-6B are flow diagrams illustrating a process 600 of writing source data to the non-volatile memory 60 using the deduplication system, according to some exemplary embodiments of the present invention.

According to some embodiments, upon receiving a command to write source data (e.g., host data) to the non-volatile memory 60 (block 602), the deduplication system calculates the hash value that is associated with the source data (blocks 604-608). In so doing, the converter 100 determines whether the source data is compressed or not (block 604). The converter 100 may determine that a source data is compressed based on information about its type of compression in a file extension, header sequence, key-value metadata, and/or the like. The converter 100 may also detect compression through entropy analysis. If the source data is compressed, the converter 100 decompresses the source data according to the compression type of the source data (block 606) to generate the decompressed source data, which is in standard form. Otherwise, no decompression is performed as the source data is already in standard form (e.g., is either plain data or user-encrypted data). Then, the hash calculator 212 calculates the hash value of standard data (block 608).

After calculating the hash value, the converter 100 adds an object entry in the object map 208 associated with the hash value (block 610) and the source data. The object entry includes the host ID from the source data, the calculated hash value, the plan for transforming the source data into the standard data, and any associated compression type.

Next, the converter 100 identifies whether there is a dedup entry in the deduplication map 210 associated with the hash value (blocks 612-614), and proceeds to write stored data to the non-volatile memory 60 based on the identification, where the stored data is associated with the source data.

According to some embodiments, the deduplication system allows for the final form of the stored data to change (e.g., to be reformatted; blocks 616-626). For example, if the first form of the stored data had been generated using an inefficient compression algorithm, later attempts to store the same fundamental data can result in replacing the one stored copy with a more efficiently compressed version.

Thus, in response to identifying the dedup entry in the deduplication map 210 associated with the hash value, the converter 100 identifies the stored data associated with the hash value using a physical address (e.g., a first physical address) in the dedup entry (block 616). The converter 100 then identifies whether the stored data is encrypted based on the dedup entry (e.g., based on the plan and/or encryption fields of the dedup entry; block 618). If the stored data is identified as encrypted, the converter 100 then identifies whether the encryption key used to generate the stored data is a storage/drive key (e.g., if the key ID field in the example of FIG. 3 is "2"; block 620). Here, the storage/drive key may refer to a storage system encryption key or a single user drive key when there is only a single user of the storage system (i.e., not a multi-user scenario). If a storage/drive key was used, the converter 100 decrypts the stored data with the storage key and according to the encryption type of the stored data (as, e.g., defined by the encryption field of the dedup entry; block 622). If an off-drive key (i.e., a user-specific key in a storage system having multiple users) was used instead, the source data and the stored data are both user-encrypted data, in which case, no further information is written to the non-volatile memory 60, and the write process is concluded.

Once decryption is complete, or if no encryption was detected, the converter 100 identifies whether the stored data is compressed based on the dedup entry (e.g., based on the plan and/or compression fields of the dedup entry; block 624). If compressed, the converter 100 decompresses, according to the compression type of the stored file (as, e.g., defined by the compression field of the dedup entry), the decrypted stored data or, in response to identifying the stored data as not being encrypted, the stored data to generate one form of standard data (block 626).

After undoing any encryption and/or compression in the stored data to arrive at standard data, or in response to identifying no dedup entry in the deduplication map 210 associated with the hash value (in blocks 612-614), the converter 100 proceeds to write the standard data to a physical address (e.g., a second physical address) in the non-volatile memory 60 (blocks 628-636), and to update the deduplication map 210 accordingly (block 638).

In writing the standard data, the converter 100 determines whether the standard data is re-compressible based on one or more of quality of service (QoS) parameters 201, work load of the storage device 30, and user demands (block 628). If re-compressible, the converter 100 re-compresses the standard data with an appropriate algorithm satisfying the QoS parameters (block 630). Otherwise, no compression is performed.

The converter 100 then determines whether the standard data is encryptable based on one or more of quality of service (QoS) parameters 201, work load of the storage device 30, and user demands (block 632). If encryptable, the converter 100 encrypts the compressed standard data or, if not compressible, the standard data, with a key and by an appropriate algorithm satisfying the QoS parameters 201 (block 634). Otherwise, no encryption is performed.

The resulting data, which may be standard data, compressed standard data, encrypted standard data, or an encrypted version of compressed standard data (depending on compressibility and/or encryptability of the standard data), is then stored at the second physical address in the non-volatile memory 60 (block 636). In some embodiments, when the resulting data is standard data, or if, in blocks 628 or 632, it is determined that a more efficient compression/encryption is not possible due to QoS parameters, the process 600 is aborted and the old stored data remains.

The converter 100 then proceeds to add a dedup entry to, or update, the deduplication map 210 based on the operations performed (block 638). For example, in response to identifying the dedup entry in the deduplication map 210 associated with the hash value (block 614), the converter 100 may update the found dedup entry in the deduplication map 210 with the second physical address and one or more of an encryption key, encryption type, and compression type, depending on whether any compression and/or encryption was performed on the standard data to generate the standard data.

Further, in response to identifying no dedup entry in the deduplication map 210 associated with the hash value (block 614; e.g., when no discernable version of the source data exists in the storage system), the converter 100 may add a dedup entry in the deduplication map 210, which includes the physical address of the finally stored data (e.g., the second physical address) and one or more of an encryption key, encryption type, and compression type, depending on whether any compression and/or encryption was performed on the standard data to generate the standard data.

As described above, according to some embodiments, the reformatting operations of blocks 616-626 are performed only when the compression and/or encryption of the stored data can be improved. That is, in blocks 628 or 632, if the converter 100 determines that a compression/encryption that is more efficient than the original compression/encryption of the stored data is not available or is not possible due to QoS parameters, the converter 100 may simply increment the counter in the dedup entry by one, and end the write process 600 without storing any further information in the non-volatile memory 60.

Figure 7:
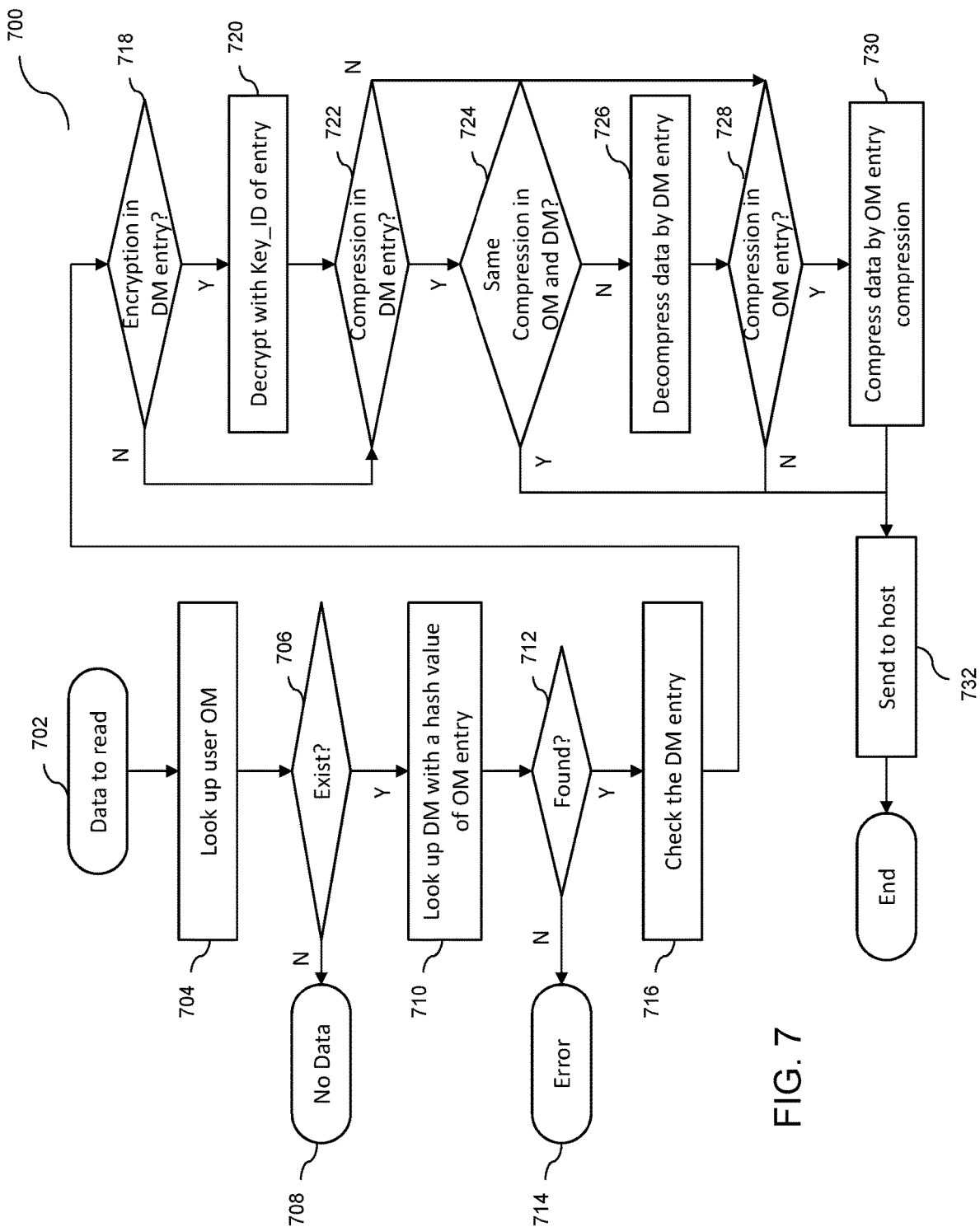
FIG. 7 is a flow diagram illustrating a process of reading data from the non-volatile memory of the storage device using the deduplication system, according to some exemplary embodiments of the present invention.

FIG. 7 is a flow diagram illustrating a process 700 of reading data from the non-volatile memory 60 using the deduplication system, according to some exemplary embodiments of the present invention.

According to some embodiments, upon receiving a command to read source data (e.g., host data) from the non-volatile memory 60 (block 702), the converter 100 identifies whether there is an object entry in the object map 208 associated with the host ID of the requested source data (block 704). If no such entry exists, an message may be sent back to the host 20 indicating that the requested data was not found in the non-volatile memory 60 (block 708). If the object entry is found, the converter 100 identifies a hash value of the object entry (block 710). In the event that no hash value is found for the object entry, an error message is sent to higher portions of the system indicating an error in the drive (block 714). Otherwise, if the hash value is found, the converter 100 identifies a dedup entry in the deduplication map 210 associated with the hash value (block 716), and retrieves the stored data associated with the host data from the non-volatile memory 60 based on a physical address in the dedup entry.

The converter 100 then identifies whether the stored data was encrypted based on the dedup entry (e.g., based on the plan and/or encryption fields of the dedup entry; block 718). In response to identifying the stored data as being encrypted, the converter 100 decrypts the stored data with the associated key (as, e.g., identified by the key ID field) and according to the associated encryption type (as, e.g., identified by the encryption field; block 720). However, no decryption is performed if the stored file was not encrypted.

The converter 100 further identifies whether the stored data was compressed based on the dedup entry (e.g., based on the plan and/or compression fields of the dedup entry; block 722). In response to identifying the stored data as being compressed, the converter 100 determines whether the same compression type is indicated in both of the dedup and object entries (block 724). If so, there may be no need to decompress and then recompress using the same compression algorithm, and the stored data, or the decrypted stored data (if stored data was encrypted), is sent to the host 20 (block 732). If the compression types indicated in the object and dedup entries are not the same (which may also occur when there is no compression in the object entry), the converter proceeds to decompresses the stored data, or the decrypted stored data (if stored data was encrypted), according to the compression type indicated in the dedup entry (block 726). This transforms the stored data into the standard data.

Next, if there is compression in the object entry (block 728), the converter 100 compresses the standard data according to the compression type indicated in the object entry (block 730). Otherwise, no further compression is performed.

The resulting data, which may be standard data or compressed standard data (depending on the indication of compression in the object entry), is then sent to the host 20 (block 732).

Figure 8:
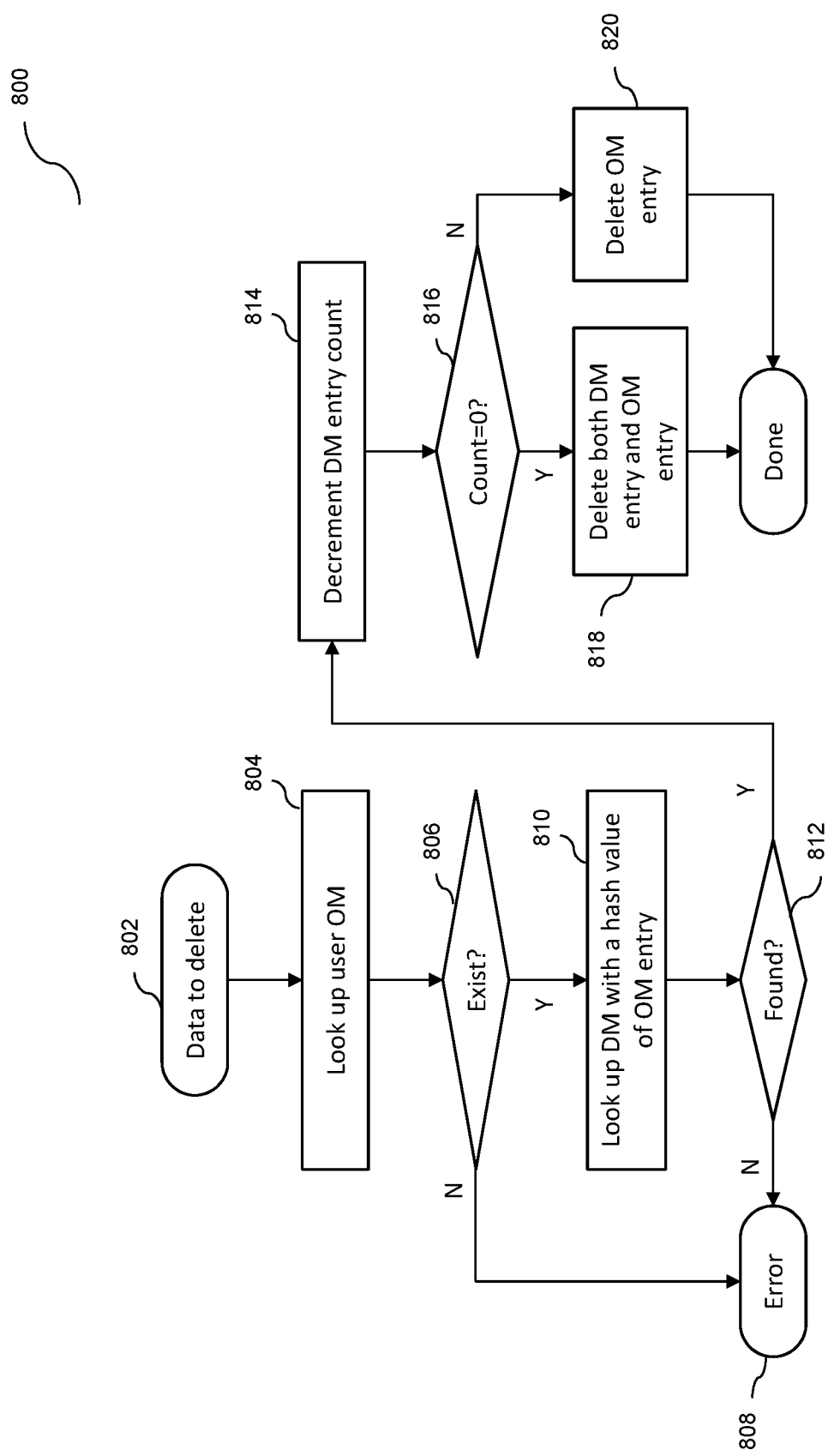
FIG. 8 is a flow diagram illustrating a process of deleting data from the non-volatile memory of the storage device using the deduplication system, according to some exemplary embodiments of the present invention.

FIG. 8 is a flow diagram illustrating a process 800 of deleting data from the non-volatile memory 60 using the deduplication system, according to some exemplary embodiments of the present invention.

According to some embodiments, upon receiving a host command to delete data from the non-volatile memory 60 (block 802), the converter 100 identifies whether an object entry in the object map 208 is associated with the host ID of the data to be deleted (block 804-806). If such an object entry does not exist an error message is generated. If the object entry is found, the converter 100 identifies a hash value of the object entry and determines whether a dedup entry in the deduplication map 210 is associated with the hash value (blocks 810-812). If such a dedup entry does not exist a corresponding error message is generated (block 808).

However, if the dedup entry is found, the converter decrements a count in the dedup entry (block 814), and determines whether the count has reached zero (block 816). If the count is zero, no more host IDs are associated with the hash value as a result of the delete command, and the converter 100 proceeds to delete the stored data associated with the hash value from the non-volatile memory 60 and further deletes the associated dedup and object entries (block 818). However, if the count is not yet zero, the converter only removed the corresponding object entry from the object map 208, and leaves the dedup entry and the stored file intact, as further host ID(s) still refer to the stored file.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on", "directly connected to", "directly coupled to", or "immediately adjacent" another element or layer, there are no intervening elements or layers present.

As used herein, the terms "use", "using", and "used" may be considered synonymous with the terms "utilize", "utilizing", and "utilized", respectively.

The deduplication system and/or any other relevant devices or components according to embodiments of the present disclosure described herein may be implemented by utilizing any suitable hardware, firmware (e.g., an application-specific integrated circuit), software, or any suitable combination of software, firmware, and hardware. For example, the various components of the deduplication system may be formed on one integrated circuit (IC) chip or on separate IC chips. Further, the various components of the deduplication system may be implemented on a flexible printed circuit film, a tape carrier package (TCP), a printed circuit board (PCB), or formed on the same substrate. Further, the various components of the deduplication system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, and scope of this disclosure, as set forth in the following claims and equivalents thereof.

What is claimed is:

1. A method for writing data to a storage device, the storage device comprising a processor, a volatile memory, and a non-volatile memory, the storage device being in communication with a host, the method comprising:
   receiving, by the processor, a command to write host data to the non-volatile memory, the host data being associated with a host identification;
   calculating, by the processor, a hash value associated with the host data by converting the host data to standard data and calculating the hash value of the standard data, wherein the converting the host data comprises at least one of decompressing the host data or decrypting the host data;
   adding, by the processor, an object entry in an object map associated with the hash value, the object entry comprising the host identification, the hash value, and a first record indicating how to convert the host data into standard data;
   identifying, by the processor, a dedup entry in a deduplication map associated with the hash value, the dedup entry comprising the hash value and a second record indicating how to convert the standard data into storable data; and
   processing, by the processor, the host data for storage in the non-volatile memory as stored data based on the identification, the stored data being associated with and different from the host data.

2. The method of claim 1, wherein the object map is one of a plurality of object maps, the plurality of object maps being associated with data of different users of the storage device, and
   wherein the dedup map is associated with data of users of the storage device.

3. The method of claim 1, wherein the converting the host data comprises at least one of decompressing the host data, wherein the calculating the hash value comprises:
   determining, by the processor, that the host data is compressed;
   decompressing, by the processor, the host data into decompressed host data according to a compression type of the host data; and
   calculating, by the processor, the hash value of the decompressed host data, and
   wherein the object map further comprises the compression type.

4. The method of claim 1, wherein the processing the host data comprises:
   in response to identifying the dedup entry in the deduplication map associated with the hash value, updating the object map and incrementing a count number in the dedup entry.

5. The method of claim 1, wherein the processing the host data comprises:
   in response to identifying the dedup entry in the deduplication map associated with the hash value and identifying a previously-stored data associated with the hash value that is compressed,
   replacing the previously-stored data with a more efficiently compressed stored data.

6. The method of claim 1, wherein the processing the host data comprises:
   in response to identifying the dedup entry in the deduplication map associated with the hash value and identifying a previously-stored data associated with the hash value that is encrypted,
   replacing the previously-stored data with a more efficiently encrypted stored data.

7. The method of claim 1, wherein the processing the host data comprises:
   in response to identifying the dedup entry in the deduplication map associated with the hash value:
      identifying, by the processor, the stored data associated with the hash value based on a first physical address in the dedup entry;
      identifying, by the processor, whether the stored data is encrypted based on the dedup entry;
      identifying, by the processor, whether the stored data is compressed based on the dedup entry;
      reformatting, by the processor, the stored data based on an encryption type and a compression type of the stored data; and
      identifying, by the processor, the standard data as the reformatted stored data;
   in response to identifying no dedup entry in the deduplication map associated with the hash value:
      identifying, by the processor, the standard data as the host data;
   processing, by the processor, the standard data into storable data for storage in a second physical address in the non-volatile memory; and
   updating, by the processor, the deduplication map.

8. The method of claim 7, wherein the reformatting the stored data comprises:
   in response to identifying the stored data as being encrypted:
      identifying, by the processor, the encryption type of the stored data in the dedup entry;
      identifying, by the processor, an encryption key of the stored data in the dedup entry as an off-drive key or a storage key;
      in response to identifying the encryption key as the off-drive key:
         maintaining encryption of the stored data;
      in response to identifying the encryption key as the storage key:
         decrypting, by the processor, the stored data with the storage key and according to the encryption type; and
      in response to identifying the stored data as not being compressed:
         identifying, by the processor, the standard data as the decrypted stored data.

9. The method of claim 8, wherein the reformatting the stored data further comprises:
   in response to identifying the stored data as being compressed:
      identifying, by the processor, the compression type of the stored data in the dedup entry;
   in response to identifying the stored data as being encrypted:
      decompressing, by the processor, according to the compression type, the decrypted stored data; and
   in response to identifying the stored data as not being encrypted:

decompressing the stored data to generate the standard data.

10. The method of claim 7, wherein the processing, by the processor, the standard data into storable data for storage comprises:
   determining, by the processor, whether the standard data is compressible based on one or more of quality of service (QoS) parameters, work load of the storage device, and user demands;
   determining, by the processor, whether the standard data is encryptable based on one or more of QOS parameters, work load of the storage device, and user demands;
   in response to determining that the standard data is compressible:
      compressing, by the processor, the standard data with an algorithm satisfying the QoS parameters to generate processed data;
   in response to determining that the standard data is not compressible:
      identifying, by the processor, the processed data as the standard data; and
   in response to determining that the standard data is not encryptable:
      storing, by the processor, the processed data at the second physical address in the non-volatile memory.

11. The method of claim 10, wherein the processing the standard data further comprises:
   in response to determining that the standard data is encryptable:
      encrypting, by the processor, the processed data with a key and by an algorithm satisfying the QoS parameters; and
      storing, by the processor, the encrypted processed data at the second physical address in the non-volatile memory.

12. The method of claim 11, wherein the key comprises an off-drive key or a storage key.

13. The method of claim 7, wherein the updating the deduplication map comprises:
   in response to identifying the dedup entry in the deduplication map associated with the hash value:
      updating, by the processor, the dedup entry in the deduplication map with the second physical address and one or more of an encryption key, encryption type, and compression type; and
   in response to identifying no dedup entry in the deduplication map associated with the hash value:
      adding, by the processor, a dedup entry in the deduplication map, the dedup entry comprising the second physical address and one or more of an encryption key, encryption type, and compression type for transforming the stored data into the standard data.

14. The method of claim 1, wherein the deduplication map and the object map are maintained in the volatile memory of the storage device.

15. A method for reading data from a storage device, the storage device comprising a processor, a volatile memory, and a non-volatile memory, the storage device being in communication with a host, the method comprising:
   receiving, by the processor, a command to read host data from the non-volatile memory, the host data being associated with a host identification;
   identifying, by the processor, an object entry in an object map associated with the host identification, the object entry comprising the host identification, a hash value, and a first record indicating how to convert the host data into standard data;
   identifying, by the processor, the hash value of the object entry;
   identifying, by the processor, a dedup entry in a deduplication map associated with the hash value, the dedup entry comprising the hash value and a second record indicating how to convert the standard data into stored data associated with the host data;
   retrieving, by the processor, the stored data from the non-volatile memory based on a physical address in the dedup entry;
   identifying, by the processor, whether the stored data is encrypted based on the dedup entry;
   identifying, by the processor, whether the stored data is compressed based on the dedup entry;
   identifying, by the processor, whether the host data is compressed based on the object entry; and
   generating, by the processor, the host data from the stored data based on whether the stored data is encrypted, the stored data is compressed, and the host data is compressed,
   wherein the generating the host data comprises, in response to identifying the stored data as being compressed:
      identifying, by the processor, a first compression type in the dedup entry;
      identifying, by the processor, a second compression type in the object entry;
      determining, by the processor, whether the first and second compression types are the same; and
      in response to determining that the first and second compression types are not the same:
         decompressing, by the processor, according to the first compression type, the stored data to generate the standard data; and
         compressing, by the processor, the standard data according to the second compression type to generate compressed standard data that is the host data.

16. The method of claim 15, wherein the generating the host data further comprises:
   in response to identifying the stored data as being encrypted:
      identifying, by the processor, an encryption type and an encryption key in the dedup entry;
      decrypting, by the processor, the stored data associated with the hash value with a storage key and according to the encryption type; and
   in response to identifying the stored data and the host data as not compressed:
      identifying, by the processor, the host data as the decrypted stored data.

17. The method of claim 15, wherein the generating the host data further comprises:
   in response to determining that the first and second compression types are the same:
      identifying, by the processor, the host data as the stored data.

18. A method for deleting data from a storage device, the storage device comprising a processor, a volatile memory, and a non-volatile memory, the storage device being in communication with a host, the method comprising:
   receiving, by the processor, a command to delete host data from the non-volatile memory, the host data being associated with a host identification;

identifying, by the processor, an object entry in an object map associated with the host identification, the object entry comprising the host identification, a hash value, and a first record indicating how to convert the host data into standard data;

identifying, by the processor, the hash value of the object entry, the hash value being calculated for the standard data corresponding to the host data, the standard data being a decrypted version or a decompressed version of the host data;

identifying, by the processor, a dedup entry in a deduplication map associated with the hash value, the dedup entry comprising the hash value and a second record indicating how to convert the standard data into stored data associated with the host data;

decrementing, by the processor, a count in the dedup entry;

determining, by the processor, whether the count equals zero; and deleting, by the processor, one or more of the object entry and the dedup entry based on the count.

19. The method of claim 18, wherein in response to determining that the count equals zero:

deleting, by the processor, the dedup entry from the deduplication map; and deleting, by the processor, the object entry from the object map;

identifying, by the processor, the stored data associated with the host data in the non-volatile memory based on a physical address in the dedup entry; and deleting, by the processor, the stored data, and wherein in response to determining that the count does not equal zero:

deleting, by the processor, the object entry from the object map.

20. A deduplication system for writing data to a storage device in communication with a host, the deduplication system comprising:

a processor; and a processor memory local to the processor, wherein the processor memory has stored thereon instructions that, when executed by the processor, cause the processor to perform:

receiving a command to write host data to a non-volatile memory, the host data being associated with a host identification;

calculating a hash value associated with the host data by converting the host data to standard data and calculating the hash value of the standard data, the converting the host data comprising at least one of decompressing the host data and decrypting the host data;

adding an object entry in an object map associated with the hash value, the object entry comprising the host identification, the hash value, and a first record indicating how to convert the host data into standard data;

identifying whether there is a dedup entry in a deduplication map associated with the hash value, the dedup entry comprising the hash value and a second record indicating how to convert the standard data into stored data; and processing the host data for storage in the non-volatile memory as stored data based on the identification, the stored data being associated with and different from the host data.

21. A deduplication system for reading data from a storage device in communication with a host, the deduplication system comprising:

a processor; and a processor memory local to the processor, wherein the processor memory has stored thereon instructions that, when executed by the processor, cause the processor to perform:

receiving a command to read host data from a non-volatile memory, the host data being associated with a host identification;

identifying an object entry in an object map associated with the host identification, the object entry comprising the host identification, a hash value, and a first record indicating how to convert the host data into standard data;

identifying the hash value of the object entry;

identifying a dedup entry in a deduplication map associated with the hash value, the dedup entry comprising the hash value and a second record indicating how to convert the standard data into stored data associated with the host data;

retrieving the stored data from the non-volatile memory based on a physical address in the dedup entry;

identifying whether the stored data is encrypted based on the dedup entry;

identifying whether the stored data is compressed based on the dedup entry;

identifying whether the host data is compressed based on the object entry; and generating the host data from the stored data based on whether the stored data is encrypted, the stored data is compressed, and the host data is compressed, the host data being different from the stored data, wherein the generating the host data comprises, in response to identifying the stored data as being compressed:

identifying, by the processor, a first compression type in the dedup entry;

identifying, by the processor, a second compression type in the object entry;

determining, by the processor, whether the first and second compression types are the same; and in response to determining that the first and second compression types are not the same:

decompressing, by the processor, according to the first compression type, the stored data to generate the standard data; and compressing, by the processor, the standard data according to the second compression type to generate compressed standard data that is the host data.

22. A deduplication system for deleting data from a storage device in communication with a host, the deduplication system comprising:

a processor; and a processor memory local to the processor, wherein the processor memory has stored thereon instructions that, when executed by the processor, cause the processor to perform:

receiving a command to delete host data from a non-volatile memory, the host data being associated with a host identification;

identifying an object entry in an object map associated with the host identification, the object entry comprising the host identification, a hash value, and a first record indicating how to convert the host data into standard data;

identifying the hash value of the object entry, the hash value being calculated for the standard data corresponding to the host data, the standard data being a decrypted version or a decompressed version of the host data;

identifying a dedup entry in a deduplication map associated with the hash value, the dedup entry comprising the hash value and a second record indicating how to convert the standard data into stored data associated with the host data;

decrementing a count in the dedup entry;

determining whether the count equals zero; and deleting one or more of the object entry and the dedup entry based on the count.

* * * * *